June 11, 1963     F. W. R. STARP     3,093,048
PHOTOGRAPHIC CAMERA ESCAPEMENT MECHANISM
Filed Oct. 25, 1960     4 Sheets-Sheet 1
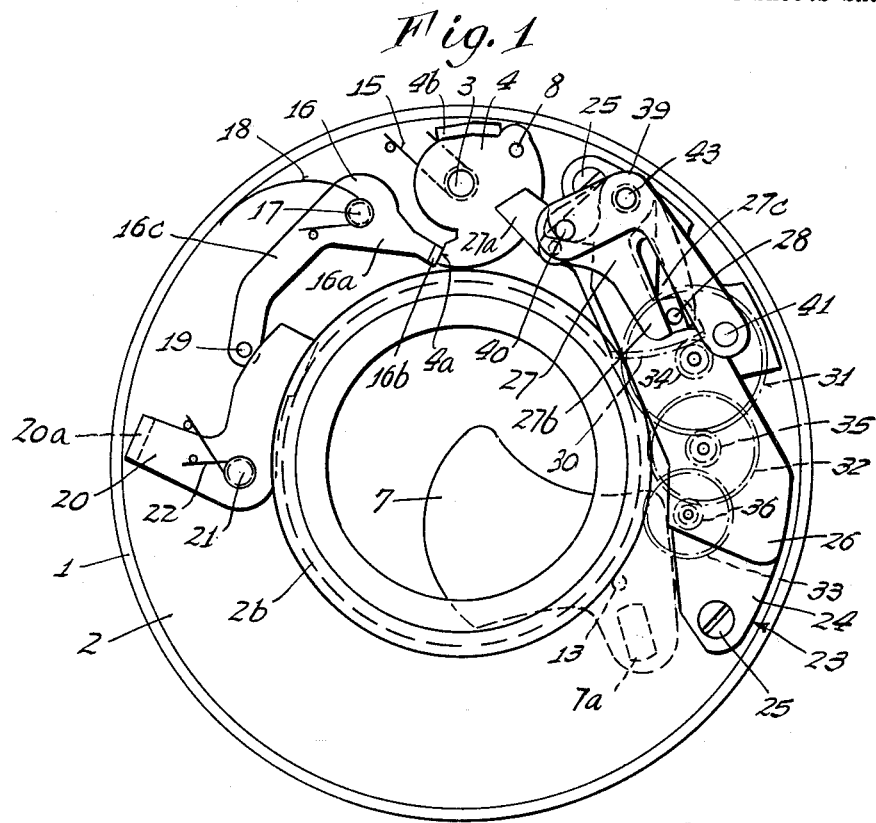
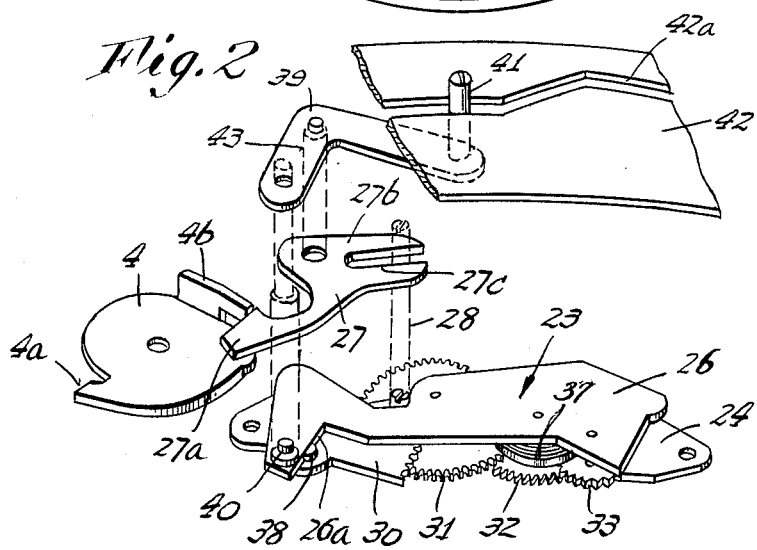
INVENTOR.
Franz Wilhelm Reinhard Starp
BY
March, Gillette, Virgil & Eslinger
ATTORNEYS June 11, 1963  F. W. R. STARP  3,093,048
PHOTOGRAPHIC CAMERA ESCAPEMENT MECHANISM
Filed Oct. 25, 1960  4 Sheets-Sheet 2
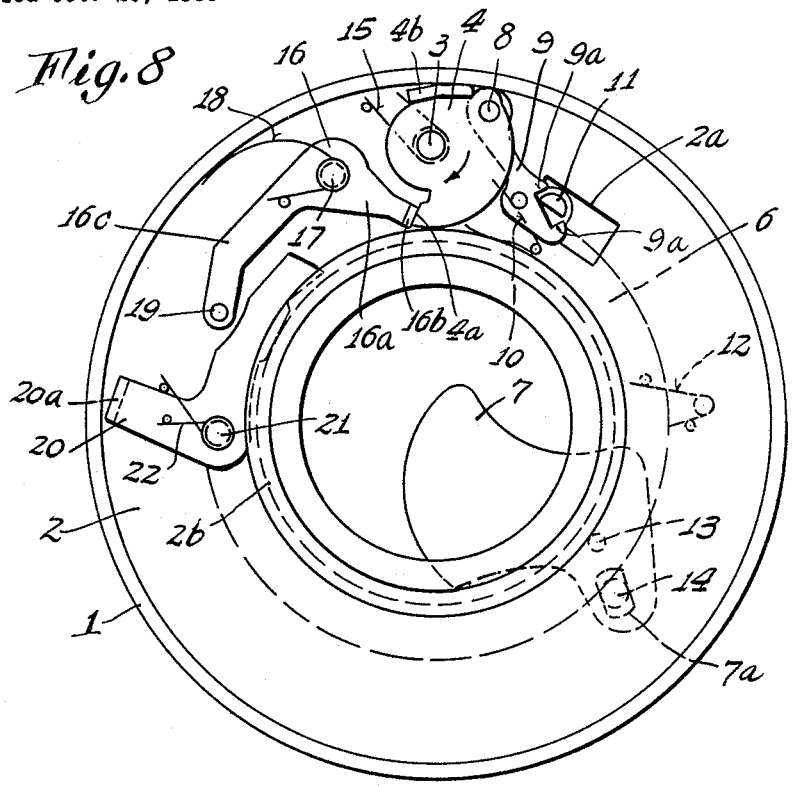
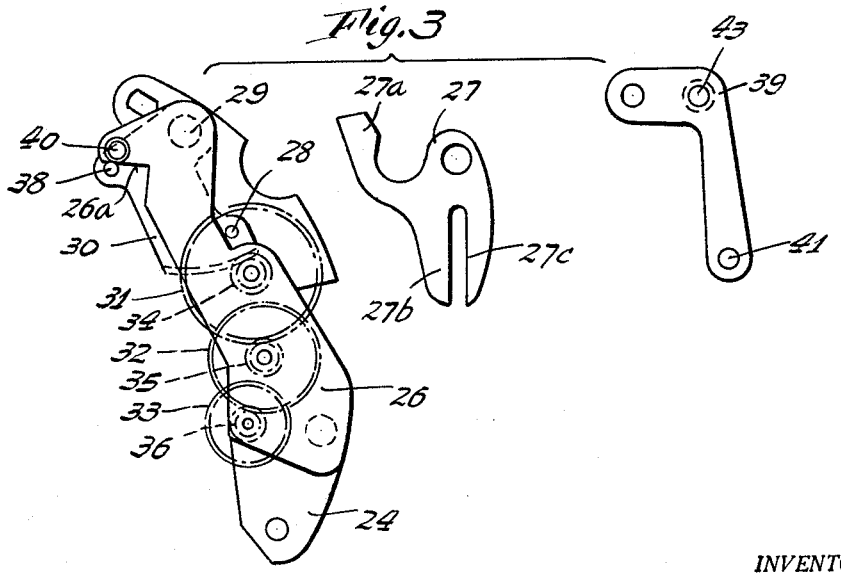
INVENTOR.
Franz Wilhelm Reinhard Starp
BY
March, Gillette, Virgil & Eslinger
ATTORNEYS

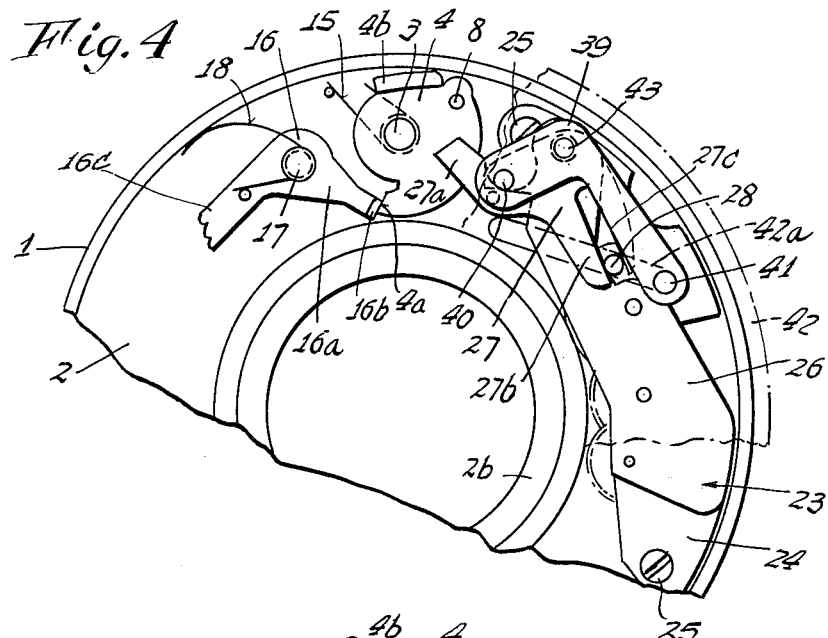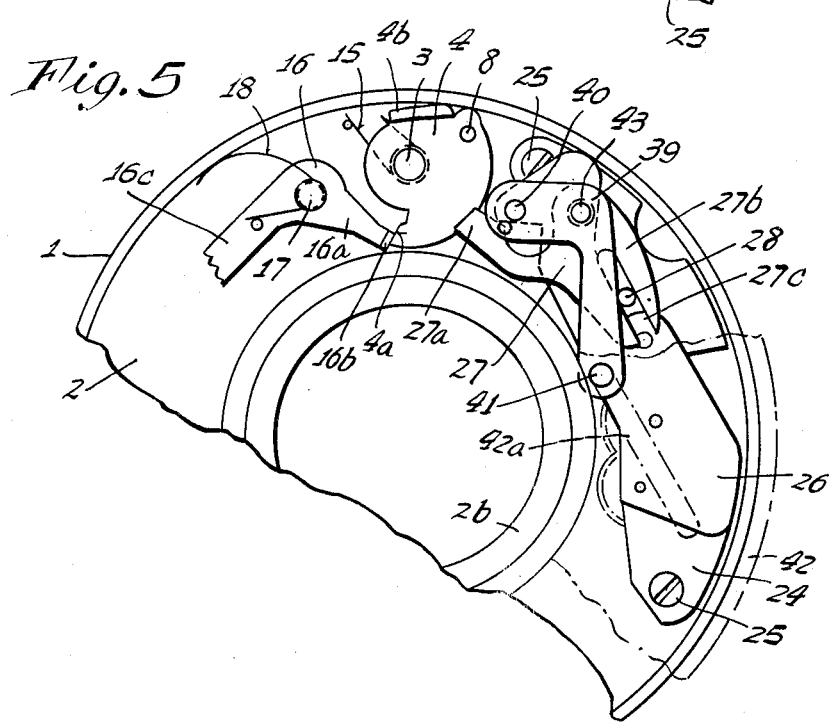

June 11, 1963 F. W. R. STARP 3,093,048
PHOTOGRAPHIC CAMERA ESCAPEMENT MECHANISM
Filed Oct. 25, 1960 4 Sheets-Sheet 4
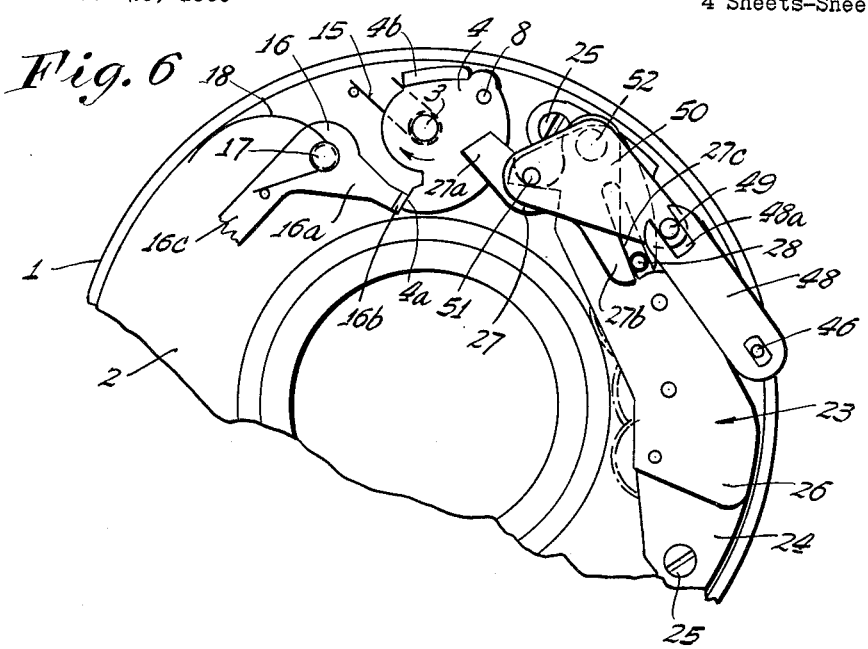
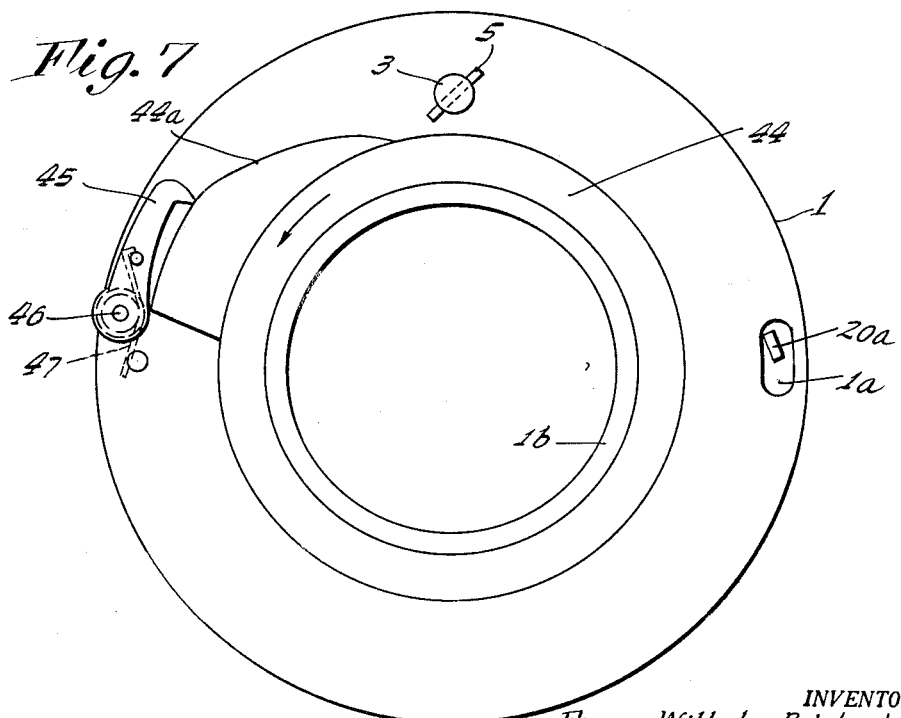
INVENTOR.
Franz Wilhelm Reinhard Starp
BY
March, Gillette, Virgil & Eslinger
ATTORNEYS United States Patent Office 3,093,048
Patented June 11, 1963

3,093,048
PHOTOGRAPHIC CAMERA ESCAPEMENT
MECHANISM
Franz Wilhelm Reinhard Starp, Calmbach (Enz), Germany, assignor to Alfred Gauthier, G.m.b.H., a corporation of Germany
Filed Oct. 25, 1960, Ser. No. 64,844
Claims priority, application Germany Oct. 27, 1959
3 Claims. (Cl. 95—63)

This invention relates to time-delay and escapement mechanisms in photographic cameras or photographic shutter assemblages, especially mechanisms of the type wherein a driving member is driven or operated against the action of a restoring spring by force imparted to it by the powered device (shutter drive, for example) which is to be delayed or retarded, such driving member being connected by means of a pin-and-slot driving connection to an actuating member which latter cooperates with a movable member of the powered device which is to be delayed.

In well-known escapement mechanisms of the above type the actuating member and the driving member are always movable conjointly. In the non-cocked condition of the device which is to be delayed, as for example the shutter drive mechanism, the escapement mechanism of the delay device is in one end position and the actuating member is out of engagement with the exposure time or speed setting member which is intended to cooperate with the actuating member. But, if the device which is to be delayed is in its cocked position, the actuating member is drivingly connected with the said speed setting member under the action of the restoring spring of the escapement mechanism. Because of this mode of operation, delay-time settings which are effected when the device which is to be delayed is in its cocked stage requires the use of a comparatively great force to operate the speed setting member, since it is necessary to move the actuating member by means of the setting member against the action of the restoring spring and against the moment of inertia of the escapement mechanism. Depending on the magnitude of the change involved in effecting the delay adjustment, i.e. depending on the size of the path of movement, the force required to adjust the setting member changes. The operator notices this from the fact that the setting member is either more difficult to shift and adjust or else less difficult to adjust. This peculiarity when operating the setting member in well-known escapement mechanisms is frequently found to be unconvenient and irritating. In addition, such peculiarity produces other appreciable disadvantages in various uses of such escapement mechanisms. A case in point involves photographic cameras of the well-known type having automatic exposure time or speed setting devices, for instance.

In these cameras the speed setting member is set by a driving mechanism, being placed in a position corresponding to the prevailing light intensity and also corresponding to the setting of additional exposure factors. The sizeable or appreciable moments of movement and adjustment required for the speed setting member necessitates the use of a comparatively strong driving device or mechanism, in order to insure in each case proper and complete shifting of the setting member into its required adjusted position. This contrasts with the condition that the cocking moment (moment required to cock) of the driving mechanism for the speed setting member is desirably kept as low as possible in the interest of a convenient and easy (work-saving) method of operating the camera. Moreover, the running-down of the speed setting member in automatic setting cameras is delayed because of the displacement of the actuating member against the action of the restoring spring and against the moments of adjustment of the escapement mechanism. This results in a comparatively great time interval being had between the start of movement of the speed setting member and the termination of the setting process as well as the subsequent release of the shutter. This is especially disadvantageous for carrying out snapshots, which require in the interest of optimal results that the exposure setting be terminated very quickly. In addition to the above, the use of escapement mechanisms of the initially described kind in cameras provided with an automatically running down speed setting member may result in inaccuracies in obtaining the proper exposure time, thus being due to the fact that an impulse transmitted by the running-down speed setting member which is relied on to move the actuating member of the escapement mechanism may cause this latter to vibrate, and these vibrations may not have ceased at the time that the shutter starts to take over or run down.

Known in the art is an escapement mechanism for photographic shutters wherein a gear which comprises the driving member of the escapement mechanism (cooperating with the driving mechanism of the shutter) can be uncoupled or disconnected from the remainder of the escapement mechanism during certain running down phases of the same, for the purpose of obtaining different delay times. The release of the coupling is effected by means of a stop lever which is adjustable by an exposure time or speed setting member and upon which a coupling pawl impinges after the escapement has run down for a shorter or longer period of time. An escapement of this type avoids the aforementioned disadvantages, but it is of a complicated structure likely to have breakdowns or failures. Another disadvantage consists in the fact that the gear group comprising the driving member of the escapement mechanism continues to influence the running down of the shutter even after it has been uncoupled.

The above drawbacks and disadvantages are obviated by the present invention, and one object of the invention is to provide a novel and improved time-delay and escapement mechanism in a photographic camera which is extremely simple, dependable and economical to fabricate, and which eliminates the appreciable and variable loading of the speed setting member of the camera or shutter assemblage.

In effecting such improved time-delay and escapement mechanism there is provided by the invention an adjusting device or adjustable mounting means for the actuating member of the escapement mechanism, by which such member may be placed in different adjusted positions with respect to the driving member of the escapement mechanism, as permitted by a pin-and-slot driving connection between these two members, this being readily possible even while the driving member is maintained in its starting position during the setting operation by the restoring spring of the escapement mechanism. The organization provided by the invention also includes a means for adjustably shifting the adjustably mounting device to various positions corresponding to the desired delay time, by means of and in response to operation of the well-known exposure time or speed setting member. Such shifting may be effected by means of a cam connected with the speed setting member.

The invention thus provides, in a delay and escapement mechanism of the general type described above, the important advantage that the moment of force or adjustment which is required for shifting the delay-time setting member or speed setting member during the cocked condition of the device which is to be delayed (as for example the shutter drive mechanism) has a minimum value while at the same time essentially the basic construction of the escapement mechanism is retained. This is due to the fact that, in the escapement mechanism as provided by the invention, only the adjustable mounting means and the actuating member of the mechanism are moved or shifted to effect the settings or different delay times, whereas the entire escapement mechanism which determines the time of delay remains, during the setting operation, in its starting or initial condition as determined by the restoring spring. By virtue of the pin-and-slot driving connection provided between the actuating member and the driving member of the escapement mechanism, this connection is effective without requiring additional springs, and this also contributes to the obtaining of a small adjusting moment of the time delay device. An organization as thus provided in accordance with the invention is particularly suited for being built into or incorporated in photographic cameras of the type provided with an automatic speed setting mechanism, wherein the speed setting member is influenced or powered by a driving mechanism. The small moments of adjustment of the setting member make it possible to keep the driving force for such setting member relatively low, which has a favorable effect both from the standpoint of the construction of the entire camera mechanism and from the standpoint of the mode of operation of the camera. Moreover, since the setting movement of the speed setting member is not influenced by the action of the escapement mechanism, there is had a quick running down of the latter and thereby a quick completion of the exposure setting. The invention further eliminates changing the position of the escapement mechanism driving member during the setting operation, whereby the escapement mechanism is dependably at rest at the start of the run-down of the shutter, thereby making it possible to obtain accurately the exposure time which is intended to be associated with the respective setting position of the speed setting member.

The invention is not negatived by the fact that it is already known to provide a photographic intra-lens shutter with an exposure time or speed escapement mechanism wherein the actuating member for the mechanism is constituted as a movable double-armed lever, one arm of which is located in the path of movement of the main driving member of the shutter drive mechanism whereas the other arm is engageable with a pivotal control edge developed and provided on the driving member of the escapement mechanism. The connection between this control edge of the driving member and the actuating lever, in this known embodiment and construction, is tensionally effected by means of a spring which acts on the driving member. For the purpose of obtaining different delay times, the actuating lever is adjustably positioned by means of a cam provided on the speed setting member. At each change of position of such lever the forcible connection between the same and the control edge of the driving member continues to remain in effect, by virtue of the said spring providing the tensional connection. This means that a change of the exposure time setting must be effected against the action of such spring and also against the moment of movement of the escapement mechanism. Such arrangement therefor also has the disadvantage previously mentioned, especially the disadvantage of a comparatively great moment of adjustment of the speed setting member being required.

A particularly simple and compact construction involving few components is had, in accordance with the invention, by constituting the adjusting device as a member which is movable in a stationary or fixed guide or bearing, such member for example a pivotally movable lever adjustably carrying the actuating member and adjustably positioning the latter. This results in additional advantages, especially with respect to elimination of small structural and critical adjusting tolerances and the obtaining of a quick, simple assemblage of the device which is to be delayed, since the movable member may be mounted on the escapement mechanism, as for example on a bearing plate thereof.

The accompanying drawings illustrate the invention by means of two embodiments relating to photographic intra-lens shutters.

FIGURE 1 is a front elevational view of assembled interior components of a photographic intra-lens shutter assemblage as provided by the invention, the cover plate having been removed as well as the speed setting ring to reveal the interior construction. Within the shutter housing are shown members of the shutter blade driving mechanism as well as the improved delay and escapement mechanism provided by the invention. The shutter is shown in its cocked condition.

FIG. 2 is a perspective exploded view of the escapement mechanism illustrated in FIG. 1 and of the main driving member of the shutter and a portion of the speed setting member and control cam slot thereof.

FIG. 3 is an exploded plan view of the escapement mechanism of FIGS. 1 and 2. The actuating member of the escapement mechanism and the adjustable mounting means (comprising a bell crank lever) for the actuating member are shown separately, in disassembled positions.

FIG. 4 is a fragmentary front elevational view of the interior of the shutter assemblage, being similar to that of FIG. 1 with the shutter cocked and with the time delay mechanism adjusted for the longest time interval.

FIG. 5 is a view like that of FIG. 4, but showing the time delay mechanism set for the shortest time interval.

FIG. 6 is a fragmentary front elevational view of interior components of an intra-lens shutter assemblage illustrating a different embodiment of the invention, wherein the actuating member of the time delay mechanism is connected with the speed setting member in a different manner.

FIG. 7 is a rear elevational view of the shutter assemblage of FIG. 6, showing the cam operator of the speed setting ring.

FIG. 8 is a front elevational view of the interior of the intra-lens shutter assemblage, illustrating the shutter blade driving mechanism and the release device for the same.

Referring now to FIGS. 1 and 4–8, the housing of the intra-lens shutter assemblage is indicated by the numeral 1. Fixed within the housing, in a well-known manner, is a shutter base plate 2 which serves to mount and position well-known members of the shutter mechanism. More particularly there is shown mounted on the base plate 2 a cocking and driving disk 4 for the shutter, such disk being carried about an axis 3 secured to the plate. The axis 3 is arranged to function as a cocking shaft for the driving disk. For this purpose, it projects from the rear wall of the shutter housing 1 and is coupled by means of a transverse pin 5 affixed thereto (FIG. 7) in a well-known manner (not shown for reasons of clarity of illustration) with a cocking mechanism provided on the side of the camera, as for example the film transport device of the camera.

The shutter drive mechanism includes a driving blade ring 6 connected with the shutter blades 7, and for the purpose of actuating the driving ring 6 there is provided a link 9 which is pivotally carried about an axis 8 in a well-known manner on the shutter driving disk 4 (FIG. 8). The driving link 9 has a side notch forming jaws 9a, the notch receiving a pin 11 of semi-circular cross section, which is affixed to the shutter blade driving ring 6. A wire spring 10 continually biases the driving link 9 in a counterclockwise direction to retain and maintain engagement between the pin 11 and the edges of the notch defined by the jaws 9a. A clearance slot 2a is provided in the shutter base plate 2, through which the pin 11 extends. When the driving disk 4 runs down from its cocked position in a clockwise direction as indicated by the arrow in FIG. 8, the driving ring 6 is actuated to have a reciprocating motion, whereby the shutter blades 7 are first opened and thereafter closed again, after the open position has been reached. A light spring 12 acting on the driving ring 6 serves to secure the shutter blades in their closed positions during the cocking of the shutter drive mechanism. The shutter blades 7, only one of which is shown for the sake of clarity of illustration, are positioned about pivot pins 13 provided on the driving ring 6 and are, in addition, engaged with fixed pins 14 extending through slots 7a in the shutter blades. An arresting or latching lever 16 retains the driving disk 4 in its cocked position against the action of the driving spring 15, as seen in the various figures, the lever 16 turning about an axis 17 which is provided on the shutter base plate 2. One end 16a of the lever 16 has a lug or tab 16b which engages a projection 4a of the driving disk 4, whereas the other arm 16c of the lever has a pin 19 affixed to it which engages a release lever 20 under the action of a spring 18. The lever 20 is pivotally positioned about an axis 21 provided on the shutter base plate 2, and is biased in a clockwise direction by a spring 22. To establish a connection with the camera release (not shown) which is carried by the camera housing, the lever 20 has a bent-off arm or lug 20a which projects from the rear wall of the shutter housing 1, passing through a suitable clearance slot 1a therefor as shown in FIG. 7.

Referring to FIGS. 1, 2, 4, 5 and 6, the delay device comprises a gear escapement mechanism 23 which is mounted on the base plate 2, for the purpose of obtaining different shutter speeds. The mechanism 23 has a lower bearing plate 24 which is affixed to the shutter base plate 2 by screws 25, and an upper bearing plate 26 which is connected in a well-known manner to the lower bearing plate 24. A pivotally movable two-armed lever 27 constitutes the actuating member of the mechanism. One arm 27a of the lever 27 is movable into the path of a lug 4b on the driving disk 4, by which the disk actuates the lever during the operation of the shutter. The other arm 27b of the lever 27 has a slot 27c into which there is disposed a pin 28. The pin 28 is affixed to a toothed segment 30 which is pivotally movable about an axis 29 (see FIG. 3). The toothed segment 30 drives gears 31, 32 and 33 of the escapement mechanism, to which pinions 34, 35 and 36 are respectively affixed. A restoring or return spring 37 (FIG. 2) tends to keep the escapement mechanism in an initial starting position as shown in FIGS. 2 and 3, wherein a pin 38 affixed to the toothed segment 30 engages an edge 26a of the upper bearing plate 26.

In accordance with the present invention there is provided for the actuating lever 27 an adjustable mounting means or device which shifts the lever to different relative positions with respect to the toothed segment 30 for the purpose of setting a desired delay time. Such variable positioning of the actuating lever 27 is made possible by the pin-and-slot connection 27c, 28 and may be effected when the toothed segment 30 is held in its starting position by the restoring spring 37 during the setting operation.

The adjustable mounting means of the invention as illustrated in FIGS. 1 to 5 comprises a bell crank or angle-shaped lever 39 which is pivotally movable about an axis 40 provided on the top bearing plate 26 of the escapement mechanism. Affixed to the free end of the lever 39 is an eccentric or cam follower pin 41 which is received in a control slot 42a of a speed setting ring 42 shown in full lines in FIG. 2 and in dot and dash lines in FIGS. 4 and 5. The speed setting ring 42 may be turned in either of opposite directions for purposes of adjustment, as is well understood. The setting ring 42 bears, in a well-known manner, on a tubular piece or nozzle 2b of the shutter base plate 2. The actuating lever 27 is pivotally movable about an axis or pin 43 carried by the adjustable mounting lever 39. The above described delay device operates in the following manner:

Upon adjustment of the speed setting ring 42, the cam slot 42a of the same pivotally shifts the bell crank or angle-shaped lever 39 about the fixed axis 40, such movement taking place in either a clockwise or counterclockwise direction depending upon the direction of rotation of the speed setting ring. The pivoting movement of the lever 39 causes the actuating lever 27 to be adjustably shifted along the pin 28 which is affixed to the toothed segment 30 while said toothed segment is held in its starting position shown in FIGS. 2 and 3 by the restoring spring 37 of the escapement mechanism. Such adjustment or displacement of the actuating lever 27 has the effect of changing the effective length of the arm 27a thereof which cooperates with the member 4b of the driving disk 4 of the shutter, thereby changing the duration of the delay time which may be obtained. In this connection it is essential that only the members 27, 39 are adjusted during the setting of the desired exposure or delay time, whereas the toothed segment 30 as well as the members 31 through 36 of the escapement mechanism which is connected to the toothed segment remains in their starting positions under the action of their restoring spring 37. This results in only a small moment of movement being required for shifting the exposure time or speed setting ring 42.

When the cocked shutter is released for its running down movement by actuating the release lever 20 after the desired exposure time has been set, the bent off lug 4b of the driving disk 4 impinges or strikes the arm 27a of the actuating lever 27 after the shutter blades have reached their open positions. This drives the lever 27 and also the toothed segment 30 in a counterclockwise direction to an extent where, as the escapement mechanism operates, the lug 4b is enabled to leave the arm 27a. The closing of the shutter then takes place in the conventional manner, as a consequence of the continued movement of the shutter driving disk 4.

While the above described embodiment of FIGS. 1 to 5 relates to a photographic intra-lens shutter in which the setting of the exposure time or shutter speed is effected manually, FIGS. 6 and 7 show a photographic intra-lens shutter constructed in accordance with the invention, wherein there may be an automatic setting of the exposure time or shutter speed.

In these figures there is illustrated a speed setting ring 44 which is positioned on the rear of the shutter housing 1 about a tubular piece or shoulder 1b provided thereon. As is well understood, in cameras having automatic exposure setting devices the speed setting ring 44 is power operated, and this may be effected by a suitable driving device which is made operative in response to actuation of the camera or shutter release, thereby automatically shifting the setting ring 44 from the starting position shown in FIG. 1 into an adjusted position corresponding to the prevailing light intensity and to the setting of additional exposure factors.

Details of the structure of control and driving devices for the setting members of a camera having an automatic exposure setting mechanism are not shown herein for the sake of clarity of illustration and inasmuch as per se they constitute no part of the present invention. Such devices may be constructed in any known or proposed manner. For example, the speed setting ring 44 may be controlled mechanically by means of a mechanical stop which is adjustable by a light intensity measuring device and which cooperates with a stepped cam provided on the speed setting ring.

As is apparent from FIG. 7, the speed setting ring 44 has a cam 44a which is engaged by a cam follower lever 45 pivotally mounted on the rear wall of the shutter housing 1. The lever 45 is affixed to a shaft 46 passing through the rear wall of the shutter housing (or through a bushing secured to said rear wall), and is maintained in engagement with the cam 44a by a light spring 47. In order to transmit the adjusted position of the speed setting ring 44 to the actuating lever 27 of the escapement mechanism, another lever 48 is affixed to the remaining end of the shaft 46 and projects into the interior of the shutter housing. The lever 48 has a pin-and-slot connection 48a, 49 with a plate 50 which is pivotally movable about an axis 51 on the upper bearing plate 26 of the escapement mechanism. The actuating lever 27 of the delay device is carried by an axis 52 mounted on the plate 50.

The mode of operation of the last-described shutter and time-delay device corresponds to that described in connection with the showing of FIGS. 1–5. There merely exists the difference that the adjustment of the speed setting ring 42 in the shutter of FIGS. 1–5 is effected manually, whereas the speed setting ring 44 in the shutter of FIGS. 6 and 7 may be automatically shifted into a position corresponding to the prevailing light intensity and to the setting of additional exposure factors.

The foregoing description illustrates the invention in connection with a photographic intra-lens shutter showing a gear escapement mechanism. In addition to the above, the invention is of importance for any kind of device where a delay action is desired, and wherein there is an actuating member connected to the escapement mechanism by a pin-and-slot connection and cooperable with a movable member of the device which is to be delayed. In all such cases the invention will produce the special advantage that the adjusting force required for actuating the speed setting member is small, and especially is substantially smaller than in well-known escapement mechanisms of the initially described kind.

I claim:
1. An escapement mechanism in a photographic camera, comprising in combination, a powered device whose action is to be delayed; a movable actuating member arranged to be driven by said powered device; a driving member movable between starting and terminal positions; a pin-and-slot driving connection between the actuating member and said driving member whereby the latter is indirectly subjected to the driving force of the powered device; mounting means including a support for the actuating member, adjustably mounting the actuating member to enable the same and the support therefor to be adjustably positioned with respect to the driving member as determined by said pin-and-slot connection while said driving member remains in its starting position; a restoring spring tending to hold the driving member in starting position; and means including a speed setting member and cam operated thereby, for adjustably positioning said mounting means.

2. An escapement mechanism as in claim 1, in which the said mounting means comprises a lever and a fixedly positioned pivot therefor, said lever movably carrying the actuating member.

3. An escapement mechanism as in claim 2, in which there is a fixed bearing plate of the escapement mechanism, which carries the pivot for the said mounting means.

References Cited in the file of this patent
UNITED STATES PATENTS

| | | |
|---|---|---|
| 2,492,723 | Willcox | Dec. 27, 1949 |
| 2,588,980 | Hodges | Mar. 11, 1952 |
| 2,900,888 | Burger | Aug. 25, 1959 |